(12) United States Patent
Dobson

(10) Patent No.: US 7,293,824 B2
(45) Date of Patent: Nov. 13, 2007

(54) VISOR ATTACHMENT MEMBER

(75) Inventor: Stanley C. Dobson, Northville, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 0 days.

(21) Appl. No.: 11/162,502

(22) Filed: Sep. 13, 2005

(65) Prior Publication Data

US 2007/0057538 A1 Mar. 15, 2007

(51) Int. Cl.
*B60J 3/02* (2006.01)

(52) U.S. Cl. ..................... 296/214; 296/97.9

(58) Field of Classification Search ............ 296/97.8, 296/214, 97.9; 248/289.11; 362/492
See application file for complete search history.

(56) References Cited

U.S. PATENT DOCUMENTS

| | | | | |
|---|---|---|---|---|
| 4,634,196 A | * | 1/1987 | Nestell | 439/27 |
| 4,913,484 A | * | 4/1990 | Dowd et al. | 296/97.12 |
| 4,989,911 A | | 2/1991 | Van Order | |
| 5,018,323 A | | 5/1991 | Clausen | |
| 5,031,953 A | * | 7/1991 | Miller | 296/97.9 |
| 5,056,853 A | | 10/1991 | Van Order | |
| 5,061,005 A | | 10/1991 | Van Order et al. | |
| 5,098,151 A | | 3/1992 | Peterson | |
| 5,201,564 A | | 4/1993 | Price | |
| 5,314,227 A | | 5/1994 | Weiland et al. | |
| 5,499,854 A | * | 3/1996 | Crotty et al. | 296/97.13 |
| 5,632,061 A | * | 5/1997 | Smith et al. | 16/444 |
| 5,636,891 A | | 6/1997 | Van Order et al. | |
| 5,662,375 A | * | 9/1997 | Adams et al. | 296/214 |
| 5,752,853 A | * | 5/1998 | Curtindale | 439/567 |
| 5,967,589 A | | 10/1999 | Spadafora | |
| 5,975,617 A | * | 11/1999 | Jacquemin et al. | 296/97.9 |
| 6,003,928 A | * | 12/1999 | Curtindale | 296/97.9 |
| 6,007,136 A | | 12/1999 | Zittwitz et al. | |
| 6,021,986 A | | 2/2000 | Murdock | |
| 6,068,323 A | * | 5/2000 | Brown et al. | 296/97.9 |
| 6,106,055 A | * | 8/2000 | Fischer | 296/214 |
| 6,179,366 B1 | | 1/2001 | Hansz | |
| 6,234,558 B1 | | 5/2001 | Curtindale | |
| 6,340,193 B1 | | 1/2002 | Sawayanagi | |
| 6,406,087 B2 | | 6/2002 | Sawayanagi | |
| 6,491,333 B2 | | 12/2002 | Ichikawa et al. | |
| 6,595,571 B1 | * | 7/2003 | Krebs et al. | 296/97.9 |
| 6,644,713 B2 | | 11/2003 | Del Pozo Abejon et al. | |
| 6,773,051 B2 | | 8/2004 | Davey et al. | |
| 6,799,743 B2 | * | 10/2004 | Sawayanagi | 248/27.1 |
| 6,896,311 B2 | | 5/2005 | Schultz et al. | |
| 2002/0017800 A1 | * | 2/2002 | Ichikawa et al. | 296/97.9 |

* cited by examiner

*Primary Examiner*—Dennis H. Pedder
*Assistant Examiner*—Mike Hernandez
(74) *Attorney, Agent, or Firm*—Brooks Kushman P.C.

(57) ABSTRACT

An attachment member for attaching a sun visor to a vehicle support structure includes a base portion that is configured to face a first side of the support structure, and a projecting portion having first and second ends. The first end is attached to the base portion, and the second end is free and extends to a location proximate the base portion. The projecting portion further has first and second spaced apart attachment features disposed proximate the first and second ends, respectively. The attachment features are engageable with a second side of the support structure. Moreover, the second end of the projecting portion is configured to flex when the projecting portion is inserted into an opening of the support structure to allow the attachment features to pass through the opening and engage the second side of the support structure.

18 Claims, 4 Drawing Sheets

VISOR ATTACHMENT MEMBER

BACKGROUND OF THE INVENTION

1. Field of the Invention

The invention relates to an attachment member for attaching a sun visor to a vehicle support structure.

2. Background Art

Attachment brackets or clips may be used to attach a sun visor to a vehicle support structure, such as a vehicle roof. One known clip includes a base portion and a projecting portion having first and second end portions that are attached to the base portion. The projecting portion further has first and second latches disposed on first and second sides, respectively, of the projecting portion. One of the latches is formed as a cantilevered member that is configured to flex inwardly when the projecting portion is inserted into an opening in a vehicle roof. As a result, the latches may pass through the opening and engage an upper surface of the roof.

SUMMARY OF THE INVENTION

Under the invention, an attachment member is provided for attaching a sun visor to a vehicle support structure having first and second opposite sides and an opening that extends therethrough. In one embodiment, the attachment member includes a base portion that is configured to face the first side of the support structure, and a projecting portion having first and second ends. The first end is attached to the base portion, and the second end is free and extends to a location proximate the base portion. The projecting portion further has first and second spaced apart attachment features disposed proximate the first and second ends, respectively. The attachment features are engageable with the second side of the support structure. Moreover, the second end of the projecting portion is configured to flex when the projecting portion is inserted into the opening of the support structure to allow the attachment features to pass through the opening and engage the second side of the support structure.

Further under the invention, a headliner assembly that is attachable to a vehicle support structure is provided, wherein the support structure has first and second opposite sides and an opening that extends therethrough. The headliner assembly includes a headliner, a visor mounting bracket and an attachment member attached to the visor mounting bracket such that the headliner extends between the attachment member and the visor mounting bracket. The attachment member has a base portion and a projecting portion extending from the base portion. The base portion is configured to face the first side of the support structure. The projecting portion has first and second ends, the first end being attached to the base portion, and the second end being free and extending to a location proximate the base portion. The projecting portion further has first and second spaced apart attachment features disposed proximate the first and second ends, respectively, and the attachment features are engageable with the second side of the support structure. Furthermore, the second end of the projecting portion is configured to flex when the projecting portion is inserted into the opening of the support structure to allow the attachment features to pass through the opening and engage the second side of the support structure.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION

The following description is merely exemplary in nature, and is in no way intended to limit the invention or its application or uses.

Figure 1:
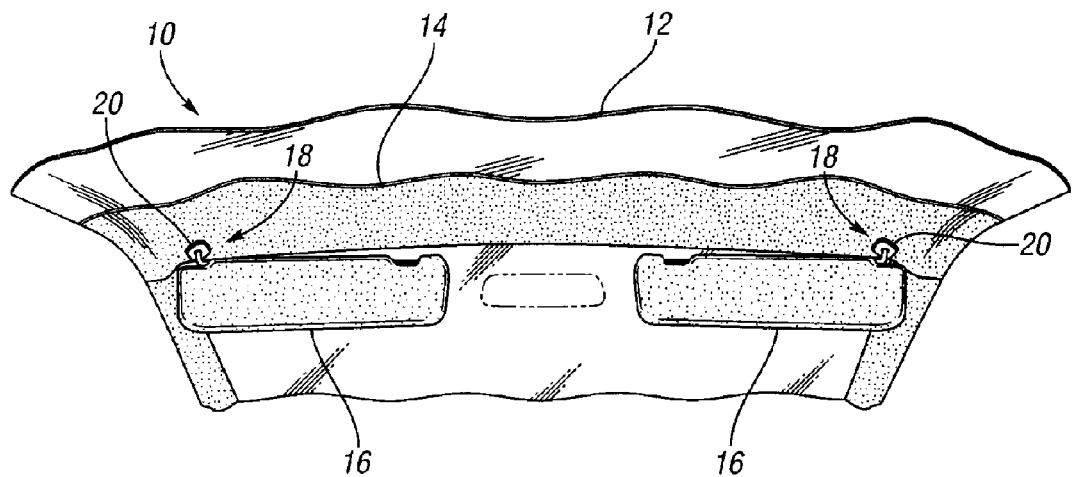
FIG. 1 is a fragmentary bottom perspective view of a headliner assembly according to the invention mounted to a support structure of a vehicle, wherein the headliner assembly includes a headliner and two sun visors that are each attached to the headliner with a visor attachment system.

Referring to FIG. 1, a headliner assembly 10 is shown mounted to a support structure 12, such as a sheet metal roof or header, of a motor vehicle. The headliner assembly 10 includes a headliner 14 and one or more sun visors 16 that are each attached to the headliner 14 with a visor attachment system 18 according to the invention. The visor attachment systems 18 are also used to attach the headliner 14 and sun visors 16 to the support structure 12.

Figure 2:
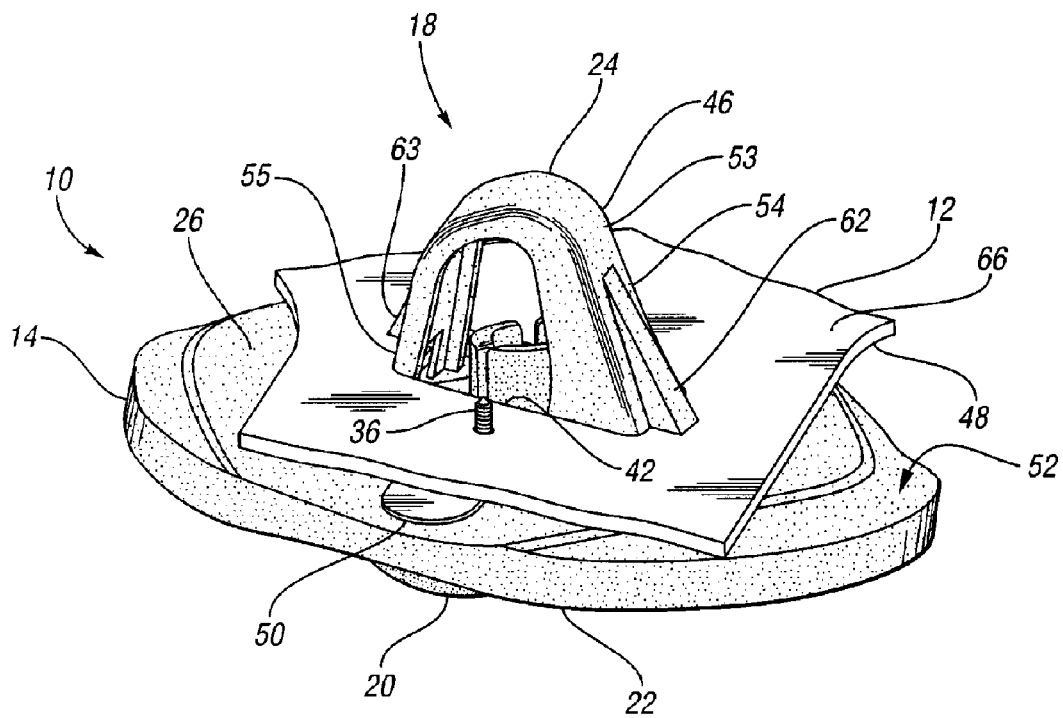
FIG. 2 is a fragmentary top perspective view of the headliner assembly showing a visor mounting bracket and an attachment member of one visor attachment system.
Figure 3:
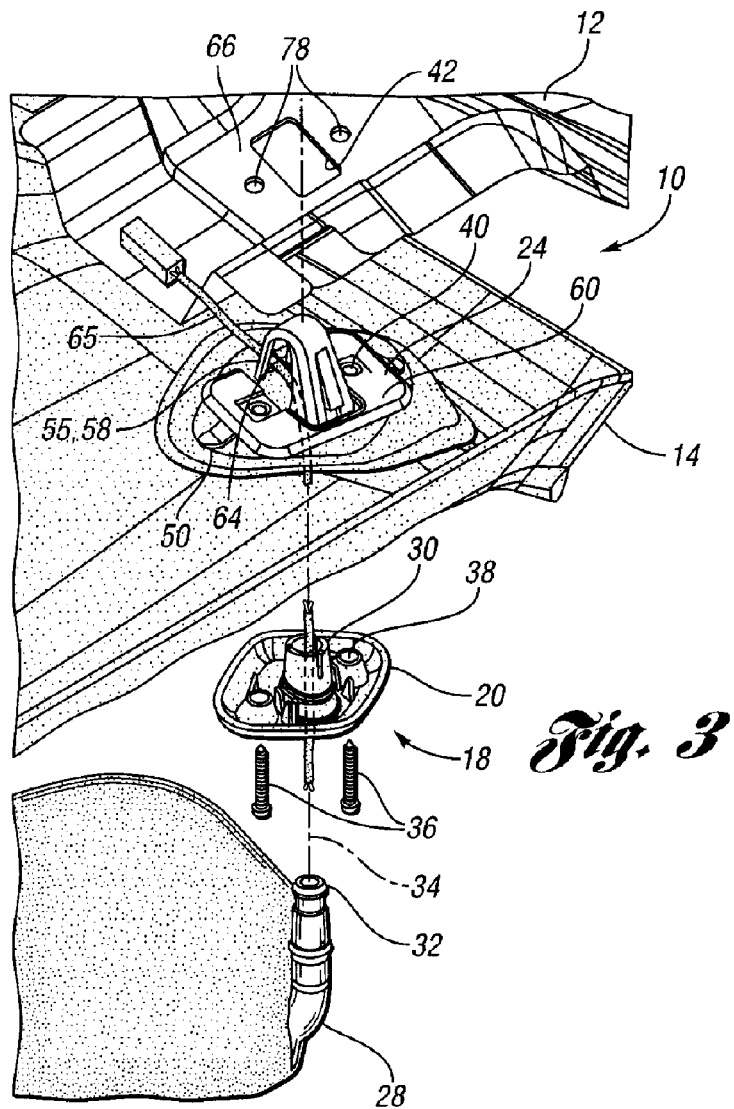
FIG. 3 is an exploded perspective view of the headliner assembly of FIG. 2.

Referring to FIGS. 2 and 3, a detailed description of one of the visor attachment systems 18 will now be provided. The visor attachment system 18 includes a visor mounting bracket 20 disposed on a first side 22 of the headliner 14, and an attachment member 24, such as a bracket or clip, attached to the visor mounting bracket 20 and disposed on a second side 26 of the headliner. The visor mounting bracket 20 is configured to receive a pivot rod 28 of a sun visor 16. For example, the visor mounting bracket 20 may have a bearing 30 that supports an enlarged end 32 of pivot rod 28 such that the pivot rod 28 may pivot with respect to the visor mounting bracket 20 about a generally vertical axis 34.

The attachment member 24 may be attached to the visor mounting bracket 20 in any suitable manner. For example, the attachment member 24 may be attached to the visor mounting bracket 20 with one or more fasteners 36, such as screws, that extend through apertures 38 in the visor mounting bracket 20 and into apertures 40 of the attachment member 24. The attachment member 24 is also configured to attach the visor mounting bracket 20 to the support structure 12, at least temporarily. For example, the attachment member 24 may be snap-fit into an opening 42 of the support structure 12 to temporarily attach the attachment member 24, visor mounting bracket 20 and headliner 14 to the vehicle support structure 12. The fasteners 36 joining the attachment member 24 to the visor mounting bracket 20 may then be driven into the support structure 12 to secure the attachment member 24, the visor mounting bracket 20 and headliner 14 to the support structure 12.

The attachment member 24 may be comprise any suitable material and may be made in any suitable manner. For example, the attachment member 24 may comprise molded plastic, such as polypropylene, polyacetal, nylon, etc. As another example, the attachment member 24 may comprise metal, such as spring steel, that is stamped and bended into a desired shape.

Figure 4:
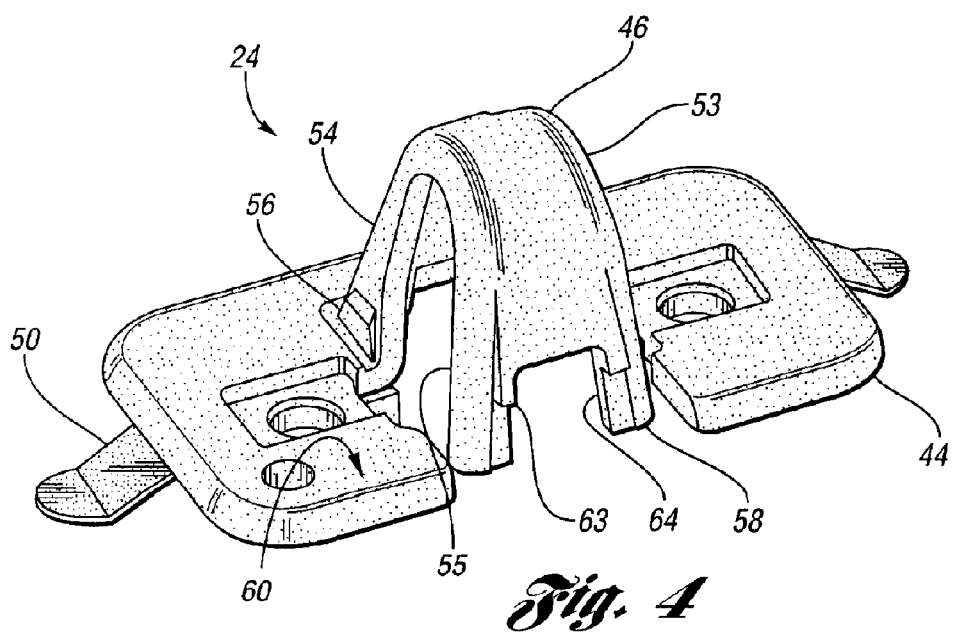
FIG. 4 is a perspective view of the attachment member of FIG. 2.

Referring to FIGS. 2-4, the attachment member 24 has a base portion 44 and a projecting portion 46 extending from the base portion 44. The base portion 44 may have any suitable configuration, such as a generally planar configuration, and is configured to face a first side 48 of the support structure 12 when the attachment member 24 is attached to the support structure 12. Furthermore, the base portion 44 may include one or more downwardly extending spring members 50 that are engageable with a back surface 52 of the headliner 14 for spacing the attachment member 24 away from the visor mounting bracket 20.

The projecting portion 46 may have any suitable configuration for insertion into the opening 42 of the support structure 12. In the embodiment shown in FIGS. 2-4, for example, the projecting portion 46 is formed as an upwardly extending hat portion having open sides. Moreover, the projecting portion 46 has a main body 53 that may define first and second legs 54 and 55, respectively. The main body 53 further has a first end 56 that is attached to the base portion 44, and an opposite free second end 58 that extends to a location proximate the base portion 44. In the embodiment shown in FIGS. 3 and 4, the second end 58 extends below a top surface 60 of the base portion 44. Because the second end 58 is not attached to the base portion 44, the second leg 55 may flex inwardly when the projecting portion 46 is inserted into the opening 42 of the support structure 12.

The projecting portion 46 further has first and second spaced apart attachment features 62 and 63, respectively, disposed proximate the first and second ends 56 and 58, respectively, of the main body 53. The attachment features 62 and 63 may have any suitable configuration for engaging a second side 66 of the support structure 12. For example, the attachment features 62 and 63 may be formed as outwardly and downwardly extending projections, such as latches. Moreover, the attachment features 62 and 63 may be fixed to the main body 53 such that the attachment features 62 and 63 remain stationary with respect to the main body 53 when the projecting portion 46 is inserted into the opening 42 of the support structure 12.

Referring to FIGS. 3 and 4, the main body 53 of the projecting portion 46 may also define one or more openings 64, such as notches, for receiving one or more electrical wires. For example, opening 64 on second leg 55 may allow wires 65 to pass through the attachment member 24 and into pivot rod 28 of sun visor 16.

Figure 5:
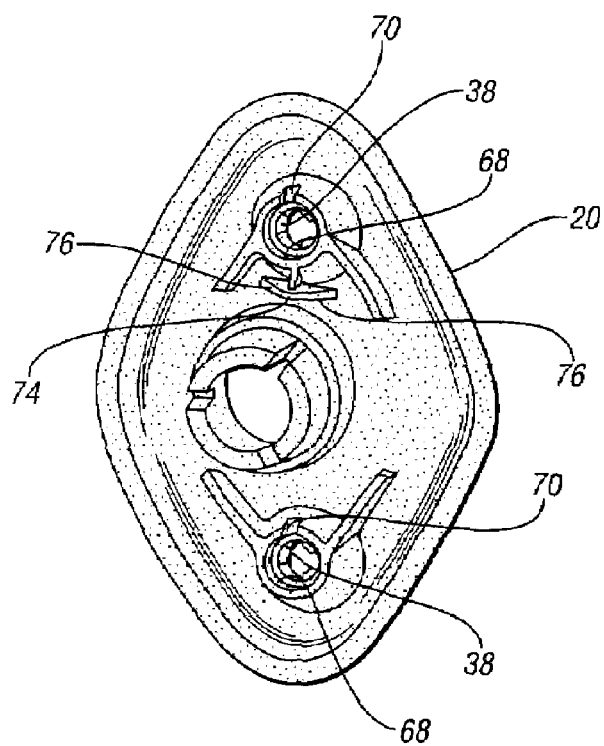
FIG. 5 is a top perspective view of the visor mounting bracket of FIG. 2 showing alignment features of the visor mounting bracket.
Figure 6:
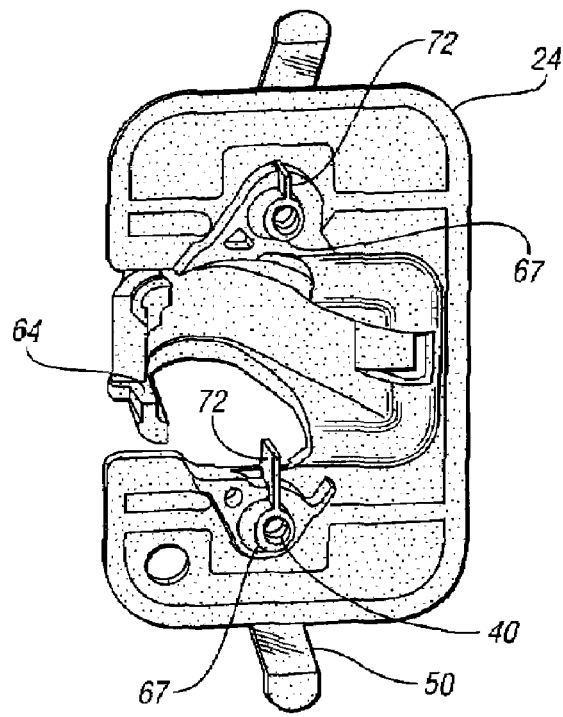
FIG. 6 is a bottom perspective view of the attachment member of FIG. 2 showing alignment features of the attachment member, which are compatible with the alignment features of the visor mounting bracket.

In addition, the attachment member 24 and/or visor mounting bracket 20 may include one or more locator or alignment features that orient the attachment member 24 and visor mounting bracket 20 with respect to each other. Referring to FIGS. 5 and 6, for example, the attachment member 24 may include one or more projections 67 that each extend into a recess 68 formed around an aperture 38 of the visor mounting bracket 20 to inhibit rotation of the attachment member 24 with respect to the visor mounting bracket 20.

Figure 7:
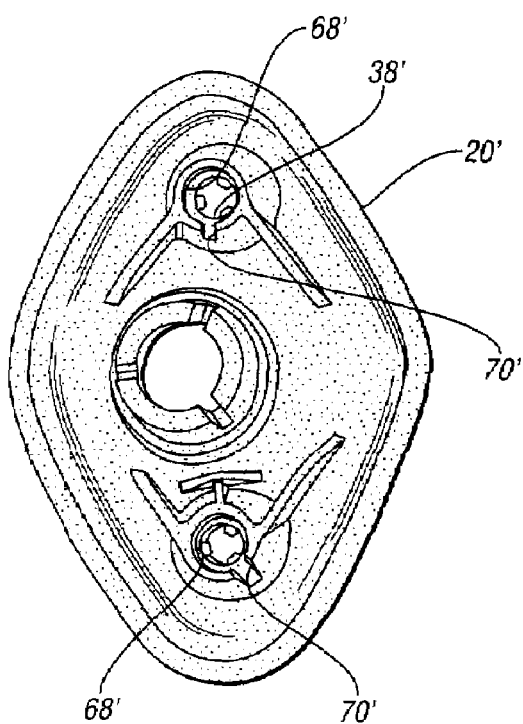
FIG. 7 is a top perspective view of an additional visor mounting bracket.
Figure 8:
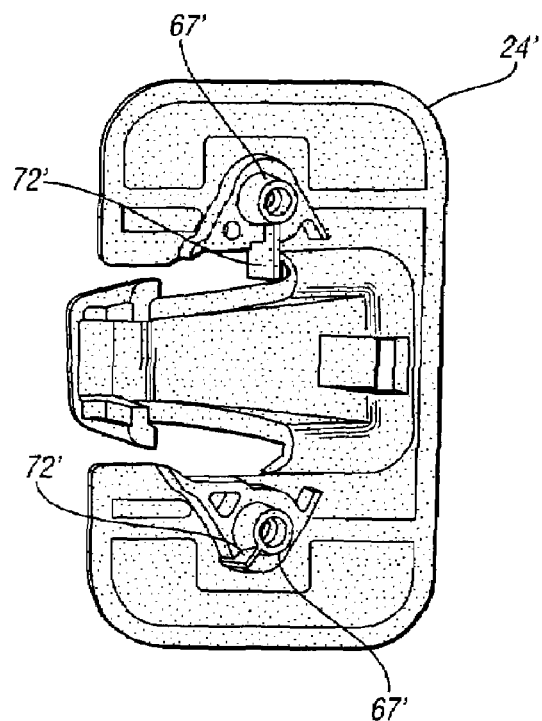
FIG. 8 is a bottom perspective view of an additional attachment member that is compatible with the visor mounting bracket of FIG. 7.

As another example, the visor mounting bracket 20 may include one or more slots 70 that each receive a projection, such as a rib 72, formed on the attachment member 24. Such features may function to align the components 20 and 24 with respect to each other and/or to ensure that the components 20 and 24 are compatible or complementary components (e.g., that both components are intended for use on the same side, driver side or passenger side, of the support structure 12). FIGS. 5 and 6 show compatible components 20 and 24, and FIGS. 7 and 8 show compatible components 20' and 24'. If the components are not complementary, such as visor mounting bracket 20 (shown in FIG. 5) and attachment member 24' (shown in FIG. 8), one of the ribs 72' on the attachment member 24' may engage an assembly aid feature, such as a rib 74, formed on the visor mounting bracket 20, thereby inhibiting proper assembly. In the embodiment shown in FIG. 5, the rib 74 on the visor mounting bracket 20 has angled sides 76 that will cause non-compatible attachment member 24' to rotate or pivot when the associated rib 72' engages the rib 74.

As yet another example, the features described above may be switched between the components 20 and 24. More specifically, the visor mounting bracket 20 may include one or more projections (not shown) that each extend into a recess (not shown) formed around an aperture 40 of the attachment member 24 to inhibit rotation of the visor mounting bracket 20 with respect to the attachment member 24. In addition, the attachment member 24 may include one or more slots (not shown) that each receive a rib (not shown) formed on the visor mounting bracket 20 to ensure that the attachment member 24 and visor mounting bracket 20 are compatible or complementary components. Moreover, the attachment member 24 may include an assembly aid feature, such as rib (not shown), that is engageable with a rib of a non-complementary visor mounting bracket (not shown), thereby inhibiting assembly of such non-complementary components.

Referring to FIGS. 2-6, an exemplary method of assembling the headliner assembly 10 will now be described in detail. First, the sun visor 16 may be attached to the visor mounting bracket 20 in any suitable manner. For example, the pivot rod 28 of the sun visor 16 may be snap-fit into the visor mounting bracket 20. More specifically, the enlarged end 32 may be inserted into the visor mounting bracket 20 until the enlarged end 32 passes through the bearing 30 of the visor mounting bracket 20.

Next, the visor mounting bracket 20 and attachment member 24 may be positioned together, with the headliner 14 therebetween, such that the locator or alignment features 67, 68 and 70, 72 cooperate with each other to ensure proper orientation of the components 20 and 24. This may be accomplished, for example, by positioning the components in an assembly fixture (not shown). The visor mounting bracket 20 and attachment member 24 may then be connected together with the fasteners 36, or by any other suitable means.

Next, referring to FIGS. 2 and 3, the attachment member 24 may be snap-fit into the opening 42 in the support structure 12. With the attachment member configuration described above, the second leg 55 of the projecting portion 46 may flex inwardly, as the projecting portion 46 is inserted into the opening 42, to allow the attachment features 62 and 63 to pass through the opening 42 and engage the second side 66 of the support structure 12. After both attachment features 62 and 63 have passed through the opening 42, the second leg 55 may flex outwardly to ensure engagement of the second attachment feature 63 with the second side 66 of the support structure 12.

Next, the fasteners 36 may be driven into corresponding apertures 78 formed in the support structure 12 to secure the headliner 14, sun visor 16, visor mounting bracket 20 and attachment member 24 to the support structure 12. Alternatively, the engagement of the attachment member 24 with the support structure 12 may sufficiently secure the visor mounting bracket 20 and attachment member 24 to the support structure 12 without the need for additional fasteners. In either case, the base portion 44 of the attachment member 24 may engage the first side 48 of the support structure 12 when the components 14, 16, 20 and 24 are secured to the support structure 12.

Alternatively, the sun visor 16 may be assembled to the visor mounting bracket 20 at any suitable time. For example, the pivot rod 28 of the sun visor 16 may be snap-fit into the visor mounting bracket 20 after the visor mounting bracket 20 has been attached to the attachment member 24. As another example, the pivot rod 28 of the sun visor 16 may be snap-fit into the visor mounting bracket 20 after the remainder of the headliner assembly 10 has been secured to the support structure 12.

With the attachment member configuration described above, the attachment member 24 may also be readily removed from the support structure 12. For example, the attachment member 24 may be pushed or otherwise moved toward a portion of the support structure 12 that is engaged with the second leg 55, thereby causing the second leg 55 to flex or move inwardly relative to the first leg 54, and also causing the first leg 54 to be released from the support structure 12. Next, the attachment member 24 may be pivoted about a generally horizontal axis extending through the second leg 55 to remove the projecting portion 46 from the opening 42 in the support structure 12.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An attachment member for attaching a sun visor to a vehicle support structure having first and second opposite sides and an opening that extends therethrough, the attachment member comprising:
   a base portion that is configured to face the first side of the support structure, the base portion having an opening for receiving a pivot rod of the sun visor; and
   a projecting portion extending over the opening of the base portion and having first and second ends, the first end being attached to the base portion, the second end being free and extending below a top surface of the base portion, the projecting portion further having first and second spaced apart attachment features disposed proximate the first and second ends, respectively, the attachment features being engageable with the second side of the support structure;
   wherein the second end of the projecting portion is configured to flex when the projecting portion is inserted into the opening of the support structure to allow the attachment features to pass through the opening and engage the second side of the support structure.

2. The attachment member of claim 1 wherein the projecting portion has a main body that includes the first and second ends, and the first and second attachment features are fixed to the main body and are configured to remain stationary with respect to the main body when the projecting portion is inserted into the opening of the support structure.

3. The attachment member of claim 2 wherein each attachment feature projects outwardly from the main body.

4. The attachment member of claim 1 wherein the projecting portion has first and second open sides.

5. The attachment member of claim 1 wherein the base portion is configured to receive a fastener that is adapted to engage the support structure for securing the attachment member to the support structure.

6. The attachment member of claim 1 wherein the base portion has one of a rib and a slot, and the one of the rib and the slot is engageable with a feature formed in a visor mounting bracket to ensure that the attachment member is compatible with the visor mounting bracket.

7. The attachment member of claim 1 wherein the base portion has a rib that is engageable with a slot formed in a visor mounting bracket to ensure that the attachment member is compatible with the visor mounting bracket.

8. The attachment member of claim 1 wherein the projecting portion has a notch formed beneath one of the attachment features for receiving an electrical wire.

9. A headliner assembly that is attachable to a vehicle support structure having first and second opposite sides and an opening that extends therethrough, the headliner assembly comprising:
   a headliner;
   a visor mounting bracket having an aperture for receiving a sun visor pivot rod; and
   an attachment member attached to the visor mounting bracket such that the headliner extends between the attachment member and the visor mounting bracket, the attachment member having a base portion and a projecting portion extending from the base portion and over the aperture of the visor mounting bracket, the base portion being configured to face the first side of the support structure, the projecting portion having first and second ends, the first end being attached to the base portion, the second end being free and extending below a top surface of the base portion, the projecting portion further having first and second spaced apart attachment features disposed proximate the first and second ends, respectively, the attachment features being engageable with the second side of the support structure, wherein the second end of the projecting portion is configured to flex when the projecting portion is inserted into the opening of the support structure to allow the attachment features to pass through the opening and engage the second side of the support structure.

10. The headliner assembly of claim 9 wherein the projecting portion of the attachment member has a main body that includes the first and second ends, and the first and second attachment features are fixed to the main body and are configured to remain stationary with respect to the main body when the projecting portion is inserted into the opening of the support structure.

11. The headliner assembly of claim 10 wherein each attachment feature projects outwardly from the main body.

12. The headliner assembly of claim 9 wherein the projecting portion of the attachment member has first and second open sides.

13. The headliner assembly of claim 9 further comprising a fastener that connects the visor mounting bracket to the attachment member, the fastener further being configured to engage the support structure for securing the attachment member to the support structure.

14. The headliner assembly of claim 9 wherein the visor mounting bracket has one of a rib and a slot, and the attachment member has the other of the rib and the slot, and wherein the rib engages the slot to ensure that the visor mounting bracket is compatible with the attachment member.

15. The headliner assembly of claim 14 wherein one of the visor mounting bracket and the attachment member has an additional rib that is engageable with a non-compatible attachment member or a non-compatible visor mounting bracket to inhibit assembly of the non-compatible attachment member or the non-compatible visor mounting bracket with the one of the visor mounting bracket and the attachment member.

16. The headliner assembly of claim 9 wherein the projecting portion of the attachment member has a notch formed beneath one of the attachment features, and wherein the headliner assembly further includes an electrical wire extending through the notch.

17. A headliner assembly that is attachable to a vehicle support structure having first and second opposite sides and an opening that extends therethrough, the headliner assembly comprising:
  a headliner;
  a visor mounting bracket having an aperture for receiving a sun visor pivot rod;
  an attachment member attached to the visor mounting bracket such that the headliner extends between the attachment member and the visor mounting bracket, the attachment member having a base portion and a projecting portion extending from the base portion, the base portion being configured to face the first side of the support structure, the projecting portion having first and second ends that are spaced apart to receive the sun visor pivot rod therebetween, the first end being attached to the base portion, the second end being free and extending below a top surface of the base portion, the projecting portion further having first and second spaced apart attachment features disposed proximate the first and second ends, respectively, the attachment features being engageable with the second side of the support structure, wherein the second end of the projecting portion is configured to flex when the projecting portion is inserted into the opening of the support structure to allow the attachment features to pass through the opening and engage the second side of the support structure.

18. The assembly of claim 17 wherein the projecting portion of the attachment member extends over the aperture of the visor mounting bracket and includes a notch formed directly beneath one of the attachment features, and wherein the assembly further includes an electrical wire extending through the notch, and a threaded fastener that connects the visor mounting bracket to the attachment member, the fastener further being configured to engage the support structure for securing the attachment member to the support structure.

* * * * *